United States Patent [19]

Neumüller

[11] Patent Number: 5,070,969
[45] Date of Patent: Dec. 10, 1991

[54] DEVICE TO LIMIT RELATIVE SPEED OF TWO ELEMENTS

[76] Inventor: Konrad Neumüller, Gibitzenhofstr 11, D-8501 Burgthann, Fed. Rep. of Germany

[21] Appl. No.: 485,980

[22] Filed: Feb. 27, 1990

[30] Foreign Application Priority Data

Mar. 7, 1989 [DE] Fed. Rep. of Germany ....... 3907251

[51] Int. Cl.[5] .......................... A47C 1/027; E05F 5/00; E05D 11/08
[52] U.S. Cl. .................................. 188/134; 74/89.15; 188/196 D; 297/361
[58] Field of Search ............... 297/364, 365, 375, 361, 297/216, 374; 74/89.15; 188/134, 196 D

[56] References Cited

U.S. PATENT DOCUMENTS

| | | |
|---|---|---|
| 3,046,055 | 7/1962 | Martens . |
| 3,350,135 | 10/1967 | Martens ........................ 297/361 X |
| 3,398,986 | 8/1968 | Homier ........................... 297/361 X |
| 4,662,485 | 5/1987 | Kanjo et al. ..................... 188/196 D |
| 4,840,257 | 6/1989 | Harrison ......................... 188/196 D |

FOREIGN PATENT DOCUMENTS

| | | |
|---|---|---|
| 2729606 | 7/1978 | Fed. Rep. of Germany ...... 188/134 |
| 1944423 | 1/1986 | Fed. Rep. of Germany . |
| 3513336 | 10/1986 | Fed. Rep. of Germany ...... 297/361 |
| 8503335 | 8/1985 | World Int. Prop. O. .......... 188/134 |

*Primary Examiner*—Peter R. Brown
*Attorney, Agent, or Firm*—Thomas R. Morrison

[57] ABSTRACT

The device (1) to prevent unintentional movements of surfaces (17, 18) which are movable towards each other essentially comprises a cylindrical casing (2) with crosspiece heads (5) connected to said casing and extending in a transverse direction and a safety mechanism (3) within said casing for a screw (4) capable of being retracted into and extended from said casing which screw is connectable via a T-shaped crosspiece to a second surface part.

7 Claims, 2 Drawing Sheets

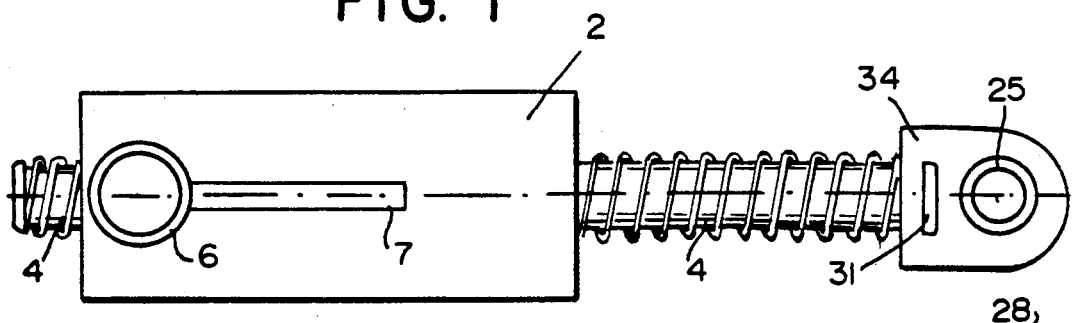
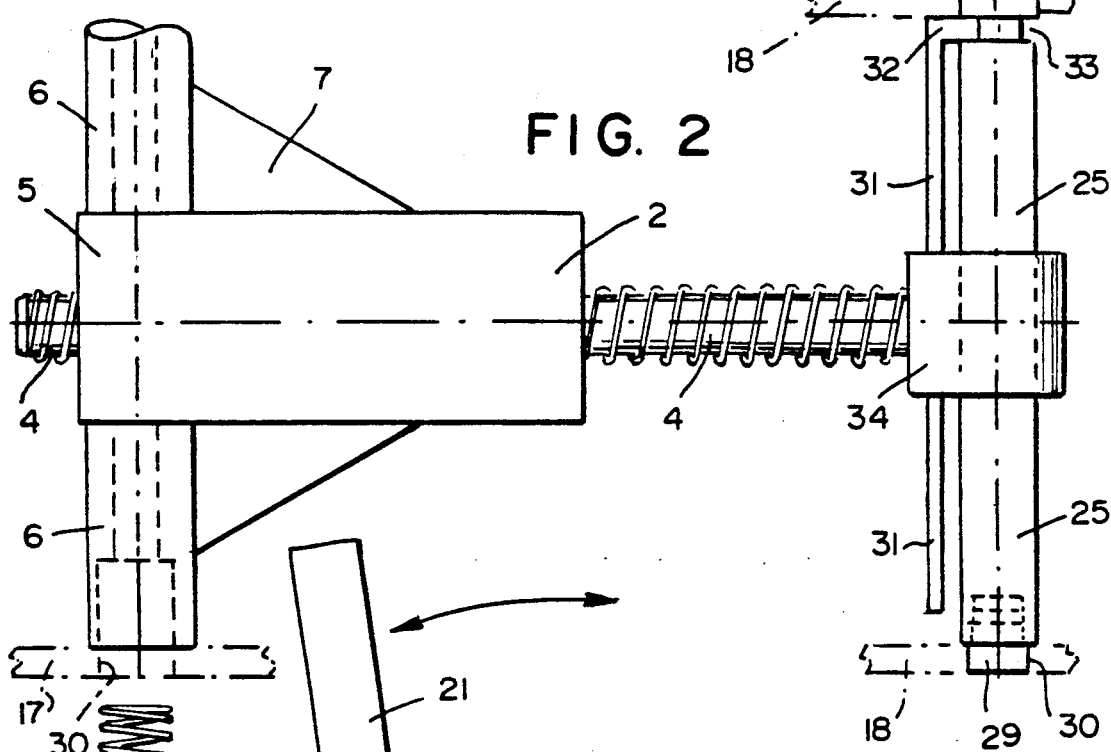
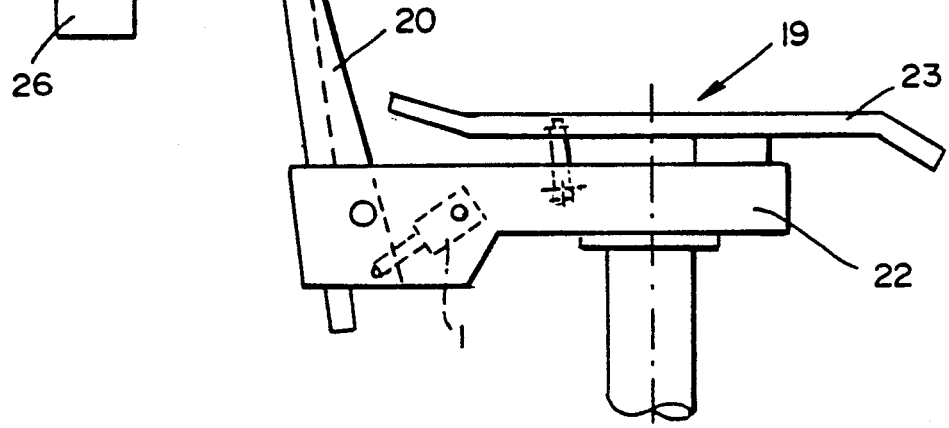

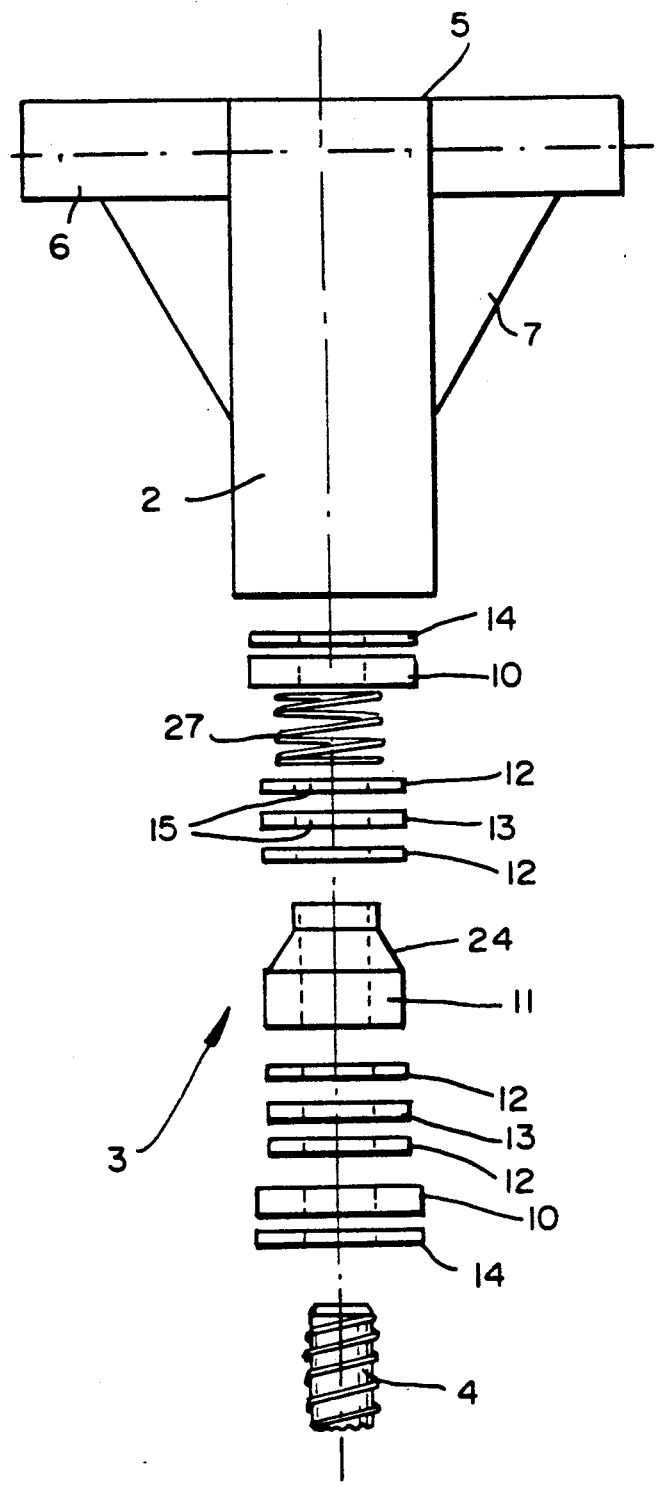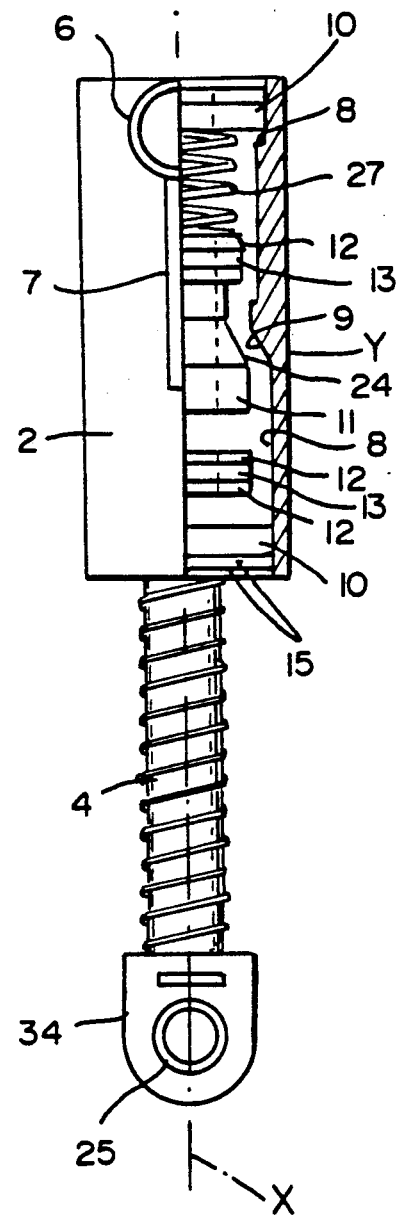

DEVICE TO LIMIT RELATIVE SPEED OF TWO ELEMENTS

This invention relates to a device to prevent unintentional motions of at least one surface capable of tilting about an axis, such as the backrest of chairs, drop doors on cabinets etc. where the said surface is movable relative to another tiltable or fixed surface and which device is installed between said surfaces and, for the purpose of releasing the motion, is equipped with at least one fixed part and a part whose length can be varied relative to the former.

It is generally known to provide various surfaces which move relative to each other, such as backrests on chairs, drop doors on cabinets or covers on containers etc. with hinges and to tilt the surfaces about these hinges. In the case of such surfaces which move relative to each other it is also known to provide damping means between these surfaces in order to prevent the one surface from falling suddenly onto the other. Mechanical springs or gas springs or hydraulic springs have found wide acceptance as damping means for this purpose. However, these damping means suffer from a drawback in that they call for a very great amount of motive power for the intentional moving of the surfaces so that, especially in the case of heavy surfaces, these require a large effort to move them into their closed or open position or into another position.

The problem in applying such damping means, for instance to chairs of the type used today as work swivel chairs in offices and workshops, is generally to dampen the movement of parts which are movable towards each other, say the backrest towards the seat, in a manner that the backrest will not in any phase of the use of the chair hit the back of a seated person or, when a person carries the chair, that the backrest will not rebound suddenly, for instance, tilt forward and cause injury to a person. To this end, the device is used between the backrest support and the seat or the base of a chair, said device following dampingly the change in length as one surface moves relative to that of the other.

Apart from the absorption of considerable energies as surfaces are moved relative to each other, it is a drawback, in particular of the damping means constructed as gas or hydraulic springs, that they are liable after a certain period of use to lose their damping fluid, e.g. oil which will then not only prevent them from producing the damping action, but also will cause serious soiling of the floor by the leaking oil. Such soiling of the floor results in considerable damage, especially where the floor is covered by wall-to-wall carpeting as is usual in many offices today.

This is the problem which the invention sets out to solve in as much as it provides for damping means operating on a mechanical principle to be further developed so that the damping means not only permit the surfaces moving relative to each other to be moved with an extremely low effort, but also permit the movement of the surfaces to be blocked without the need for outside intervention, especially where the surfaces tend to move towards each other suddenly or violently.

According to the invention, this object is achieved with a device of the type initially referred to in that the one stationary part, typically a T-shaped head for a screw connected to said head and the other stationary part is another, typically also a T-shaped head, of which the latter head is formed with a tubular casing, typically in the shape of a stub tube and in that this stub tube is formed at its inner wall with guiding and braking surfaces in axial succession for thrust and rolling elements which are movable on said screw as well as being formed with a conical braking element and in that this braking element is arranged rotatably on said screw and, in the case of sudden motions of at least one surface, is capable of being retained on the braking surface of the stub tube with force-locking action.

These features provide a damping means or, respectively, a device which not only advantageously meets the objective defined but, moreover, affords a number of further advantages. For instance, it is possible to make this device extremely compact and to match the blocking parts thereof to each other in a manner that, in the normal motion pattern of the surfaces moving towards each other, there is hardly any effort required while the braking action will be initiated instantly if any quick movements of the surfaces occur which will control or, respectively, arrest the surfaces and release the motion automatically only after a certain amount of relaxation. Added to this is the fact that the provision of mechanical initiation of the braking mechanism and, consequently, the safety mechanism of the device, the aforementioned disadvantages of prior-art damping means where oil is used as a damping fluid are avoided so that this device, on account of its safety against leakages etc., can also be used where cleanliness, for instance, of wall-to-wall carpeting is at a premium.

Another advantage of this device resides in the fact that it can also be very easily applied to furniture where, for instance, the problem is to prevent drop-type doors from dropping suddenly into their closed position after they have been opened. This is a problem encountered with kitchen furniture, but also with other furniture where injuries are liable to be caused where heavy drop doors tend to drop unintentionally because the usual type of known hinges fail to prevent or stop this sudden motion.

Further advantageous embodiments of the invention may, in particular, be found in the sub-claims.

A typical embodiment of the invention as applied for example to work swivel chairs is schematically shown in the accompanying drawings in which:

FIG. 1 is a side view of the device in the operational condition.

FIG. 2 is a plan view of the device in FIG. 1,

FIG. 3 is a typical example of the device applied to a work swivel chair where the device is interposed between the base structure of the chair and its backrest support, FIG. 4 is a exploded view of the device showing it individual components, and FIG. 5 a representation of the device in the installed condition where one half of the casing accommodating the braking mechanism is shown cut for a better view of the guiding and braking surfaces.

The device 1 according to the invention is formed essentially by a preferably tubular casing 2 with parts of a safety mechanism 3 built into said casing and a screw 4 capable of moving into and out of said casing, both the casing and the screw being each joined to a T-shaped head 5.

The casing 1, which is preferably constructed cylindrically, is joined at its one end to a transversely extending crosspiece 6 which is preferably constructed as a tube and, for the purpose of stiffening said crosspiece may be formed with ribs 7 between the casing and said crosspiece, said ribs preventing bending of the two parts relative to each other.

Provided inside the casing 2 are guiding and braking surfaces 8, 9, the guiding surfaces 8 serving to accommodate end discs 10 and the braking surface 9 to restrain a plug 11 preferably constructed as a circular nut. Between each end disc 10 and said plug 11 are provided thrust washers 12 each [group of two] having a ball bearing 13 interposed and these [sets of two] thrust washers and the ball bearing, seen in the axial direction of the plug and, respectively, the casing 2, are arranged both ahead and behind the plug 11. The end discs 10 ahead of and behind the plug 11 and, consequently, at the two ends of the casing 2 are located by means of a circlip 14, or some other retainer, in the casing 2. The end discs 10 as well as the thrust washers 12, the ball bearings 13 and the plug 11 are each formed with a hole 15 symmetrical to the longitudinal centerline X of the casing 2 through which extends the screw 4 which is connected to the other T-shaped head 5.

While the end discs 10 and, analogously the washers 12 and the ball bearings 13, too, have their hole 15 formed only for the guidance of the screw 4, the hole through the plug 11 is additionally provided with a thread so that as the length of the device 1 changes, i.e. as the T-shaped heads 5 are moved together or moved apart, the plug 11 will rotatingly slide on the screw 4.

In the region of the middle of the casing 2, i.e. in the region of the waist line Y, the casing is formed with the braking surface 9 for the plug 11 and the plug itself is provided with corresponding conical surface 24 which engages the braking surface 9 of the casing 2 with force-locking action.

The special feature of this device 1 resides in the fact that, during normal motions, for instance two surfaces 17, 18 moving towards each other, these can move without any restraint but, at the moment when one of the surfaces 17 or 18 tends to accelerate from the normal speed, and, thus, starts to move violently and quickly, the plug 11, normally held out of engagement by a spring 27, will immediately engage the braking surface 9 on the casing and block any further movement of the screw 4 in said plug and in the casing. In this manner, it is not possible for one of the surfaces, e.g. 17, when it descends to accelerate and hit the other surface 18 with an impact. In other words, the device 1 according to the invention permits a controlled movement of two surfaces 17, 18 towards each other and will take effect only when, for instance, the one surface 17 or 18 starts to move suddenly or quickly. This action prevents, say, a surface 17 or 18 from moving unintentionally fast and causing injury to persons or damage to itself when it drops down or tilts over.

When applying this device 1, for instance, to work swivel chairs 19, it is recommended that the device be joined articulately between a backrest support 20 for the backrest 21 of the chair and a base structure 22 on which is mounted the seat surface 23 of the chair. In an application of this kind, this means that the backrest 21 would follow normal motions i.e. intended motions, effortlessly but when, say, a person bends forward will not hit the back of the person with an impact, but purposefully follow the action of another frequently installed damping mechanism, e.g. a retraction spring. When, say, a chair 19 is being lifted, this action thus prevents the backrest 21 from snapping forward and hitting, for instance, the head of the person carrying the chair.

Consequently, the device 1 constitutes an important safety factor where two parts move towards each other, i.e. the surfaces 17, 18 and therefore lends itself to all applications where there is a danger of unintentional initiation of a motion causing injuries to persons or damage to property. Such applications may, as suggested in this application, exist wherever two surfaces are juxtaposed or drop doors, lids, etc. close onto their frames. This does not preclude the use of the device 1 according to the invention for other applications where it is important to exert a braking action in the case of sudden or violent motions.

For the satisfactory operation of the device 1, it is furthermore important that its screw 4 is capable of turning without any great effort in the plug 11 and, consequently, there is no self-jamming action during uniform motion of the plug on the braking surface 9 of the casing 2. Both the braking surface 9 on the casing 2 and the braking surface 24 on the plug 11 are of conical shape. The slope of the two braking surfaces 9, 24 is selected so that these surfaces will jam, but come apart at once again when the motion of the device 1 has resumed its normal speed. This means that the screw 4 as long as it uniformly plunges into the plug 11 and in the process causes the latter to turn about its longitudinal centerline X, the screw will not be hindered in its reciprocating movement. Owing to the arrangement of the braking surfaces 9, 24 on the casing 2 on the one hand and on the plug 11 on the other hand, jamming action of the screw 4 will be only in one direction of movement, i.e. when the braking surfaces 9, 24 on the plug 11 and the casing 2 are in contact.

In order to be able to attach the device 1 to the parts or surfaces 17, 18 moving towards each other, there are provided on the casing 2 and the screw 4 the heads 5 and 34 respectively. The head 5 provided on the casing 2 may take the form of the crosspiece extending transverse to the casing, e.g. in the form of a tube 6 and the crosspiece extending transverse to the screw 4 may, for instance, take the form of a pin 25. If a tube 6 is used as the crosspiece, it is recommended that it be located on the moving or stationary part or surface 17 or 18 by means of spring-loaded studs 26. Such a stud 26 as well as the load spring 35 which forces it outwards is shown in FIG. 1.

Analogous to these crosspieces of the head 5 of the casing 2 at the part to be moved, i.e. the surface 17 or 18, the head 34 of the screw 4 may also be attached by means of the pin 25 to the other part. In this case, one end of the pin 25 may be located in a hole 28 of the surface 17 or 18 and the other end of the pin by means of a spring-loaded stud 29 in another hole 30 of the surface 18 to provide form-locking support. In order to align the pin 25 symmetrically to the head 34 in this case, it is also possible to provide an angular bar 31 on the head whose hooked end 32 registers in an angular groove 33 of the pin.

The device 1 and, specifically, the casing 2 and the screw 4 may be made of metal and the remaining parts of the safety mechanism 3 of plastic. This does not preclude that all parts may be made of metal or plastic.

I claim:

1. A device to limit relative speed of a first part with respect to a second part comprising:
   a screw affixed to said first part;
   a casing affixed to said second part;
   a nut rotatably disposed on said screw;
   said nut including a first braking surface thereon;

said casing including a second braking surface, formed thereon;

said first and second braking surfaces being movable into and out of contact with each other by a predetermined amount of relative movement of said nut with respect to said casing;

resilient means in said casing for urging said nut in a direction separating said first and second braking surfaces; said nut and said resilient means being enclosed by said casing;

said nut and said screw having mating threads which permit said nut to turn freely on said screw under low-speed relative motion of said first and second parts;

said mating threads providing a force permitting said nut to be moved axially against urging of said resilient means to contact said first and second braking surfaces when said relative motion exceeds a predetermined velocity; said first braking surface being generally conical.

2. The device of claim 1 wherein:
said second braking surface includes a portion of an inner wall of said casing; and
said first braking surface axially faces said second braking surface.

3. The device of claim 1, further comprising a thrust washer intermediate said resilient means and said nut.

4. The device of claim 3, wherein said thrust washer includes a bearing.

5. The device of claim 1, further comprising means for limiting a travel of said nut in a direction separating said first and second braking surfaces.

6. The device of claim 5, wherein said means for limiting includes a thrust washer on said screw limiting travel of said nut thereon.

7. The device of claim 6, wherein said thrust washer includes a bearing.

* * * * *